(12) United States Patent
Illerhaus et al.

(10) Patent No.: US 6,840,876 B2
(45) Date of Patent: Jan. 11, 2005

(54) VARIATOR

(75) Inventors: Dietmar Illerhaus, Cincinnati, OH (US); Rudolf Kauffeldt, Sigmarszell (DE); Manfred Fischer, Kressbronn (DE); Thomas Lindner, Wilhelmsdorf-Esenhausen (DE); Dieter Blaser, Eriskirch (DE); Andreas Salm, Bodolz (DE)

(73) Assignee: ZF Transmission Technologies, L.L.C., Batavia, OH (US)

( * ) Notice: Subject to any disclaimer, the term of this patent is extended or adjusted under 35 U.S.C. 154(b) by 183 days.

(21) Appl. No.: 10/178,266

(22) Filed: Jun. 21, 2002

(65) Prior Publication Data

US 2003/0008737 A1 Jan. 9, 2003

(30) Foreign Application Priority Data

Jun. 23, 2001 (DE) ........................................ 101 30 388

(51) Int. Cl.[7] ............................................. F16H 55/30
(52) U.S. Cl. ........................................... 474/28; 474/18
(58) Field of Search .............................. 474/18, 19, 28, 474/30; 477/45, 46, 48

(56) References Cited

U.S. PATENT DOCUMENTS

| | | | | |
|---|---|---|---|---|
| 4,292,031 A | * | 9/1981 | Rattunde | 474/18 |
| 4,481,004 A | * | 11/1984 | Abbott | 474/28 |
| 4,560,369 A | * | 12/1985 | Hattori | 474/28 |
| 4,753,627 A | * | 6/1988 | Kawamoto | 474/18 |
| 4,881,925 A | * | 11/1989 | Hattori | 474/18 |
| 6,336,878 B1 | * | 1/2002 | Ehrlich et al. | 474/28 |
| 6,394,920 B1 | | 5/2002 | Morlok | 474/28 |

FOREIGN PATENT DOCUMENTS

| | | | | |
|---|---|---|---|---|
| DE | 195 33 995 A1 | | 3/1997 | ........... B60K/17/04 |
| DE | 196 03 598 A1 | | 8/1997 | ............. F16H/9/16 |
| DE | 199 32 339 A1 | | 1/2001 | ............. F16H/63/06 |
| EP | 0289025 A1 | * | 11/1988 | ........... F16H/11/06 |
| EP | 0318635 A1 | * | 6/1989 | ............. F16H/9/18 |

\* cited by examiner

*Primary Examiner*—Marcus Charles
(74) *Attorney, Agent, or Firm*—Davis & Bujold, P.L.L.C.

(57) ABSTRACT

A variator for ratio adjustment of a continuously variable chain drive transmission having one variator shaft (1) and one variator pulley (2) supported upon the variator shaft (1) and axially movable by pressurizing a variator pressure chamber (31). The variator shaft (1) has on one end an axial hole (10) through which the variator pressure chamber (31) and a second pressure chamber (8) can be loaded with pressure independent of each other. The pressure is supplied to the variator pressure chamber (31) via a first section (13) of the axial hole (10) and the pressure is supplied to the second pressure chamber (8) via a non-rotating pipe (7) and a second section (15) of the axial hole (10), the pipe (7) is situated within the first hole section (13). It is proposed that the pipe (7) has two axially adjacently disposed sealing rings (73) for reciprocal dynamic sealing of the pressure supplies to the variator pressure chamber (31) and to the second pressure chamber (8) and that the variator shaft (1) has a vent hole (9) discharging, on one side between the two sealing rings (73) and on the other side in a transmission inner space (94).

20 Claims, 1 Drawing Sheet

VARIATOR

FIELD OF THE INVENTION

The invention concerns a variator for ratio adjustment of a continuously variable chain drive transmission.

BACKGROUND OF THE INVENTION

Continuously variable transmissions usually have one variator for ratio adjustment which comprises a first cone pulley pair upon an input shaft and a second cone pulley pair upon an output shaft and belt means, such as a movable articulated chain or a pushing link band, rotating between the cone pulley pairs. Each cone pulley pair consists of a first pulley, stationary in an axial direction, and a second cone pulley, movable in an axial direction. The input shaft of the variator is usually designated as a primary shaft and, accordingly, the first cone pulley pair as a primary pulley pair. Similarly the output shaft of the variator is customarily designated as a secondary shaft and the second cone pulley pair as a secondary pulley pair. The primary pulley and secondary pulley and thus the ratio therebetween are adjusted by a pressure medium. To this end, an electrohydraulic control unit controls the pressure level of the adjustment spaces of the primary and secondary pulleys via electromagnetic actuators and hydraulic valves. The pressure medium is usually conveyed by the electrohydraulic transmission control, via ducts located in the transmission housing, to an axial hole of the primary shaft or the secondary shaft and from there to a pressure chamber of the primary pulley or the secondary pulley, the required hole diameter or hole cross-section resulting from the volume adjustment needed by the variator.

DE-A-195 33 995 has disclosed a continuously variable transmission where the primary shaft end on the input side has a first axial hole for supplying pressure to a clutch, and the primary shaft end opposite to the input has a second axial hole for supplying the primary pressure. The primary pressure is supplied to said second axial hole of the primary shaft from a duct situated in the transmission housing, via a sleeve firmly plugged in the duct discharge in the transmission housing, which sleeve extends into the second axial hole of the primary shaft. A single rectangular ring is provided for sealing between the stationary sleeve and the rotating primary shaft.

In DE-A-199 32 339 a continuously variable transmission has been disclosed where an axial hole, designed as a stepped hole is provided in the primary shaft through which the primary pressure is conveyed to the pressure chamber of the primary pulley and also a lubrication pressure independent of the primary pressure is conveyed to another component. For the supply of the pressurized oil needed to adjust the primary pulley, a primary pressure duct is provided in the transmission housing, between the primary pulley and a housing cover adjacent the primary shaft, which extends substantially radially to the center of the primary shaft and discharges on an inner cover which ensures sealing between cover and the inner diameter of the large hole of the axial stepped hole of the primary shaft. A single rectangular ring is provided as a sealing element between the stationary inner cover and the rotating primary shaft. The housing cover further has a tubular projection which serves as a duct for lubrication pressure and sinks down to the small hole of the stepped hole of the axial primary shaft sealing it against the large hole of the stepped hole of the axial primary shaft. To this end, a rectangular ring is situated on the outer diameter of a dipping projection end. The lubrication oil is passed, via an inner hole of the tubular projection of the cover, into the small hole of the axial stepped hole of the primary shaft and from there to one other component. Therefore, primary pressure abuts on the annular space between the outer diameter of the tubular cover projection and the inner diameter of the large hole of the axial stepped hole of the primary shaft while lubrication pressure abuts on the small hole of the axial stepped hole of the primary shaft.

A failure of the rectangular ring, which separates the two pressure areas from each other as a consequence of the great leakage on the rectangular ring, can result, on one hand, in failure of the transmission when the second component is loaded with too high a pressure level (primary pressure) and, on the other hand, also to critical driving states when undesirable lubrication pressure is introduced in the pressure chamber of the primary pulley thus triggering or preventing an adjustment of the variator, or when the second component is a shifting element and the primary pressure is introduced in the piston chamber of this clutch thereby triggering an undesirable shifting operation.

DE-A-196 03 598 describes a secondary set of a variator for a continuously variable transmission where the secondary shaft has an axial hole through which the secondary pressure to a secondary pressure chamber and a lubrication pressure independent of the secondary pressure to a pressure compensation space of the secondary pulley are both passed. The pressurized oil is supplied to the secondary pressure chamber from a duct of the transmission housing via a pipe inserted in the transmission housing and extending into the axial secondary shaft hole. The lubrication oil is supplied for dynamic pressure compensation of the secondary set, via an annular space, between the outer diameter of the pipe and the inner diameter of the axial secondary shaft hole. A low friction bearing plugged between the stationary pipe and the axial secondary shaft hole is provided in the axial secondary shaft hole for two-way sealing of both pressure supplies.

Excessive leakage on the low friction bearing which separates the two pressure supplied in the axial secondary shaft hole from each other on the pressure side, can also result here in function interruptions of the variator when the pressure-compensation space of the secondary pulley is undesirably loaded with a high pressure level.

SUMMARY OF THE INVENTION

The problem to be solved by the invention is to show a variator for the ratio adjustment of a continuously variable transmission where, on the same shaft end of its primary shaft or of its secondary shaft, two pressures independent from each other are introduced in an axial hole of the primary shaft or of the secondary shaft and said two pressures are reliably reciprocally sealed.

This problem is solved by a variator having the features stated in the main claim. Advantageous embodiments and developments result from the subclaims.

On the basis of the prior art, the inventive variator has one shaft supported in a transmission housing and one pulley supported upon the variator shaft which pulley is axially movable by pressurization of a variator pressure chamber. On one end, the variator shaft has an axial hole through which the variator pressure chamber and a second pressure chamber can be loaded with pressure independent of each other. The pressure here is supplied to the variator pressure chamber via a first hole section of the axial variator shaft hole and the pressure is supplied to the second pressure chamber via a pipe fastened on the transmission housing and a second hole section of the axial hole of the variator shaft and the pipe is situated within the first hole section.

According to the invention, the pipe has two sealing rings disposed axially adjacent and preferably designed as rectangular rings for dynamic sealing of the pressure supplies to the second pressure chamber from the pressure supply to the variator pressure chamber. According to the invention, the variator has a vent hole which, on one side, discharges between the two rectangular rings and, on the other side, in an inner space of the transmission.

In this manner, a reliable reciprocal sealing of the two pressures is obtained which are introduced from the same end of the variator shaft into the axial hole thereof. Compared to the prior art, on one hand, by virtue of the reduced pressure change load of the individual sealing rings of the double dynamic sealing, an increased security against failure of said rotating seal results. On the other hand, by virtue of the ventilation disposed between the two sealing rings, leakage is eliminated on the sealing rings, especially leakage on the sealing ring facing the pressure chamber loaded with higher pressure in the inner space of the transmission approximately free of overpressure and thus an undesirable leakage current between the two pressure chambers is reliably prevented.

BRIEF DESCRIPTION OF THE DRAWING

The invention is now explained in detail with reference to the following figures based on the example of a primary set of the variator. The inventive solution shown here for a primary shaft can also obviously can also be applied to a secondary set of the variator. In the drawings.

All the elements common to FIGS. 1 and 2, or that perform the same functions, have the same reference numerals.

DETAIL DESCRIPTION OF THE INVENTION

Figure 1:
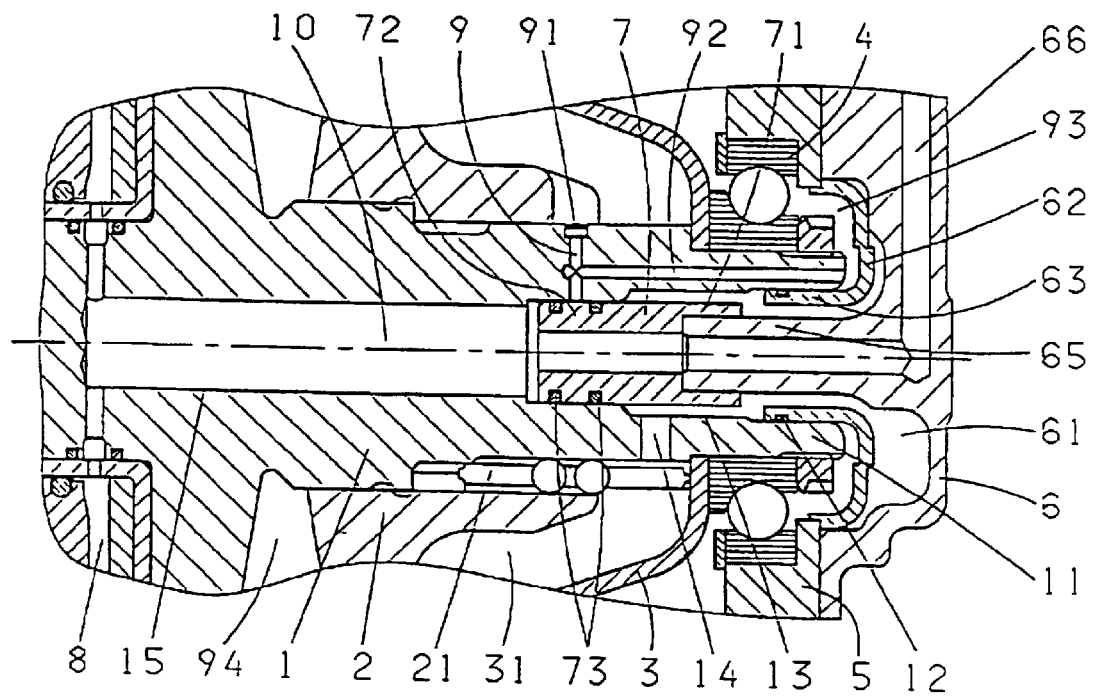
FIG. 1 is a first embodiment of an inventive variator.

FIG. 1 now shows, by way of example, an embodiment of an inventive variator. A variator shaft, here a primary shaft, is designated with a reference numeral 1. A variator pulley 2, here a primary pulley, is supported upon the variator shaft 1 and axially movable via a linear guide 21. A cylinder 3, here a primary cylinder, fixedly situated upon the variator shaft 1 forms, together with the variator pulley 2, a variator pressure chamber 31, here a primary pressure chamber which, for ratio adjustment of the variator, can be loaded with a modulatable pressurized oil. In another development, several cylinders can obviously be provided to form a stepped pressure chamber for the variator.

The variator shaft 1 is supported by a bearing 4 in a transmission housing 5 which has a housing cover 6 on the supported shaft end. In another development it is also provided that the transmission housing is designed as one piece in the area of support of the variator shaft, that is, it has no separate cover in this area.

An axial hole 10, which can also be designed as a stepped hole, is provided in the variator shaft 1 on the shaft end of the variator shaft 1 supported by the transmission housing 5. Via said axial hole 10 in the variator shaft 1, two different pressure chambers, namely, the variator pressure chamber 31 and a second pressure chamber 8, are supplied with pressurized oil independently of each other.

The same as in DE-A-1969 32 339, for the supply of the pressurized oil needed for axial adjustment of the variator pressure chamber 31, a variator pressure duct 61 is provided in the transmission housing 5, between the variator pulley 2 and the housing cover 6 abutting on the variator shaft 1, extending substantially radially to the center of the variator shaft 1 and discharging in an inner cover 62 which is inserted in an oil tight sealing manner in the housing cover 6. The inner cover 62 ensures the seal between the housing cover 6 and the inner diameter of the axial hole 10 of the variator shaft 1. To this end, the inner cover 62 has a tubular projection 63 which extends into the axial hole 10 of the variator shaft 1, and upon an outer diameter of which a sealing element 12, designed as a rectangular ring, is situated as a dynamic sealing element between the stationary inner cover 62 and a section 11 of the rotating variator shaft 1 placed on the side of the housing cover.

The housing cover 6 further has a tubular projection 65 which also extends into the axial hole 10 of the variator shaft 1 and serves as second pressure duct for oil supply to the second pressure chamber 8. The embodiment of FIG. 1 provides that the projection 65, of the housing cover 6, be fixedly and oil tight sealingly connected with a section 71 on the side of the housing cover which is situated within the axial hole 10 of the variator shaft 1. An annular gap remains between the projection 65 of the housing cover 6 and the projection 63 of the inner cover 62, the same as between the outer diameter of the hole 7 and the inner diameter of the axial hole 10 of the variator shaft 1. The first section of the axial hole 10 of the variator shaft 1 is designated with 13.

According to the invention the pipe 7 has a second pipe section 72, on an outer diameter thereof remote from the housing cover, two axially adjacent sealing rings 73, preferably designed as rectangular rings, which seal the stationary pipe 7 against the inner diameter of the axial hole 10 of the rotating variator shaft 1 as dynamic sealing elements. Therefore, the two areas of the pressure supplies 61 and 66 that extend within the variator shaft 1 are dynamically sealed relative to each other. In the first section 13 of the axial hole 10 of the variator shaft 1, a modulatable variator pressure abuts while in a second section 15 of the axial hole 10, which in an axial direction attaches itself to the first section 13, a pressure which is associated with the second pressure chamber prevails and, depending on the type of the second pressure chamber, likewise is modulatable or at least approximately constant. From the first section 13 of the axial hole 10 of the variator shaft 1, a radial hole 14 through which the pressurized oil needed for adjustment of the variator pulley 2 reaches the variator pressure chamber 31. From the second section 15 of the axial hole 10 of the variator shaft 1, a radial hole branches off through which the second pressure chamber 8 is supplied with oil.

In another development of the pressure supply to the axial hole of the variator shaft, it also can be provided that the tubular projection 65 of the housing cover 6 extends in an axial direction beyond the radial hole 14 of the variator shaft 1 so that it is possible to omit the pipe 7 and both sealing rings 73 are disposed directly upon the outer diameter of the tubular projection 65. The tubular projection with the second pressure duct 66 for the oil supply of the second pressure chamber 8 obviously can be designed as a projection of the transmission housing when a one-piece transmission housing, without a cover, is provided in the area of the variator shaft bearing 4.

According to the invention, the space between the two sealing rings 73 situated in the second pipe section 72 is vented toward the inner space of the transmission housing 5 which is at least almost free of overpressure. In the first embodiment of an inventive variator according to FIG. 1, the variator shaft 1 has to this end an at least almost radial vent hole 9 which discharges from an area in the axial hole 10 of the variator shaft 1, between the two sealing rings 73 of the pipe 7, and is shut on the outer diameter of the variator shaft 1 by means of a cover 91 and an at least approximately axial vent hole 92 branches off therefrom. The axial vent hole 92 discharges, on the end of the variator shaft 1 that faces the housing cover, in an inner area 93 inside the transmission near the bearing 4.

In an other development, the ventilation of the space between the two sealing rings 73 of the pipe 7 to the transmission inner area 93 near the bearing 4, it can also be provided to design the vent hole in the variator shaft 1 as a diagonal hole whereby the cover 91 can be eliminated.

Compared to the prior art, the double dynamic sealing between the two pressure areas with two sealing rings advantageously reduces the pressure change load of the individual sealing rings whereby an increased safety is achieved against failure of said rotating seal. By virtue of the ventilation disposed between the two sealing rings, a leakage is advantageously eliminated on the sealing rings, especially the leakage on the sealing ring that faces the pressure chamber loaded with higher pressure in the transmission interior at least almost free of overpressure, thus reliably preventing an undesired leakage flow between the two pressure chambers.

Figure 2:
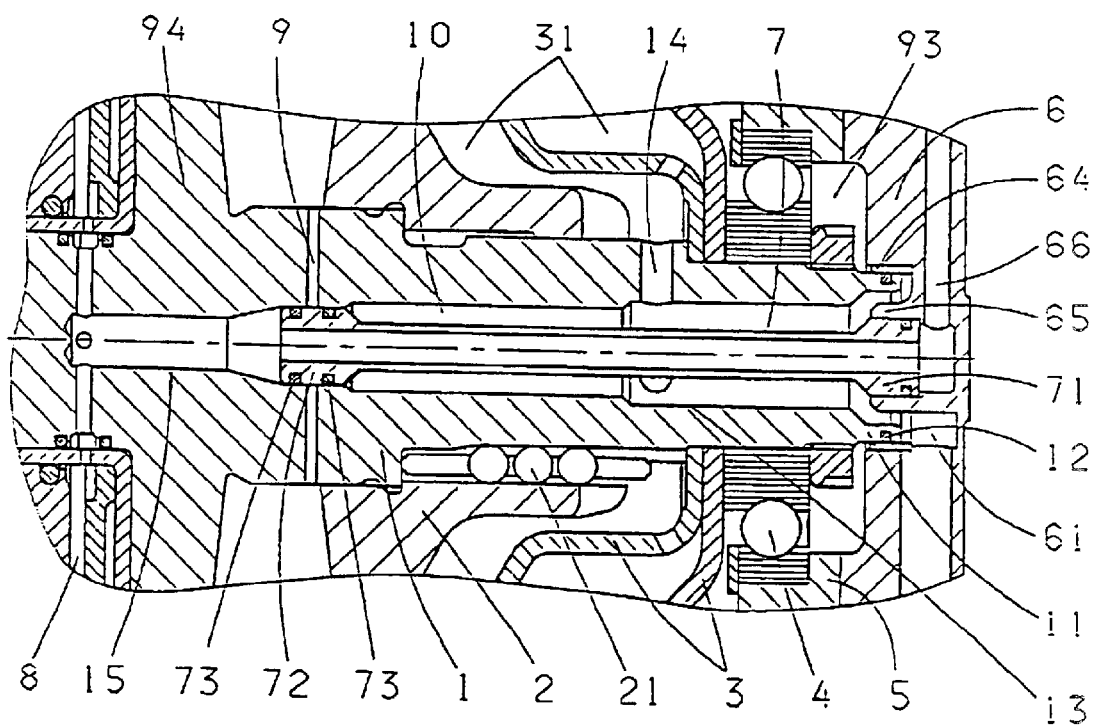
FIG. 2 is a second embodiment of an inventive variator.

FIG. 2 now shows, by way of example, a second embodiment of an inventive variator. Unlike in the first embodiment described in FIG. 1, ventilation of the space between the two sealing rings 73 is constructionally simplified, which dynamically seal the two pressure areas within the axial hole 10 of the variator shaft 1 against each other. Another difference concerns the construction of both pressure ducts 61 and 66 in the housing cover 6.

The primary variator shown in FIG. 2 has two cylinders 3 and two variator pressure chambers 31 interconnected on the pressure side which, therefore, work as a stepped pressure space combined with the variator pulley 2. In another development, a single cylinder 3 and a single variator pressure chamber 31 obviously can also be provided.

As shown in FIG. 2, the variator pressure duct 61 is now designed as a hole in the housing cover 6. Hence, the inner cover is eliminated. The sealing ring 12, preferably is designed as a rectangular ring which, as a rotating sealing element, ensures the dynamic sealing between the stationary housing cover 61 and the rotating variator shaft 1, now situated upon the outer diameter of the variator shaft 1 in the section 11 thereof on the side of the housing cover. As countercurrent surface of the rectangular ring 12 a bearing race 64, preferably made of steel or a low friction material, is inserted in the housing cover 6. In another development of said bearing race, it evidently can also be provided that the sealing ring 12 extends directly upon the housing cover 6, that is, that the separate bearing race is eliminated, which requires a suitable material for the housing cover, such as a silicon alloyed aluminum pressure casting.

The tubular projection 65 of the housing cover 6 invariably extends into the axial hole 10 of the variator shaft 1, but unlike in the above described first embodiment it is axially shorter. Placed in the interior of the axial hole 10 and oil tight sealingly connected with the projection 65, the pipe 7 is, accordingly, longer and coveys the pressurized oil in its inner diameter from the second pressure duct 66 of the housing cover 6 to the second pressure chamber 8. By this design, a larger cross-section of the annular gap is advantageously achieved between the outer diameter of the pipe 7 in the inner diameter of the first section 13 of the axial variator shaft hole 19 thus improving the oil supply to the variator pressure chamber 31.

As in the first inventive embodiment, the pipe 7 has on its second section 72 two sealing rings disposed axially adjacent, and preferably designed as rectangular rings 73, which ensure the dynamic reciprocal sealing of both pressures for the adjustment of the variator pulley 2 and the second pressure chamber 8. The inventive ventilation of the space between both sealing rings 73 is now designed as a single radial vent hole 9 in the variator shaft 1. On one side, the vent hole 9 discharges from the inner diameter of the axial variator shaft hole 10 in the area between both sealing rings 73 and, on the other side, on the outer diameter of the variator shaft 1 in an area beneath a chain drive means (not shown) of the variator in a transmission inner space 93. The ventilation, therefore, takes place in an area between the cone pulley pair of the primary set or of the secondary set depending on whether the variator shaft 1 is a primary shaft or a secondary shaft.

In another development of the ventilation of the space between both sealing rings 73, it can also be provided to design the vent hole 9 as diagonal hole so that it discharges, on one side, from the inner diameter of the axial variator shaft hole 10 in the area between both sealing rings 73 and, on the other side, on the outer diameter of the variator shaft 1 in an area beneath the drive chain means of the variator in the transmission inner space 93.

With regard to the operating reliability of the dynamic sealing of the two pressures independent of each other within the axial variator shaft hole 10, in the second embodiment given by way of example of an inventive variator according to FIG. 2, the same advantages as with the first inventive embodiment described above with reference to FIG. 1 result. In a specially advantageous manner, the ventilation of the space between the two sealing rings 73 is constructonally very simple in the second embodiment and the production cost accordingly low. As a further advantage, the elimination of the axial vent hole 92 makes an improved configuration for the annular gap between the outer diameter of the pipe 7 in the inner diameter of the first section 13 of the axial variator shaft hole 10 possible, for example, an enlarged cross-section for the pressure supply of the variator without impairing the strength of the variator shaft 1.

As already mentioned, the inventive solution of the problem applies both to a primary shaft and to a secondary shaft of the variator. If the variator shaft 1 is a primary shaft, then the second pressure chamber 8 is preferably associated with a shifting element such as clutch pressure chamber or a pressure compensation space. In the second section 15 of the axial variator shaft hole 10, either a clutch pressure modulatable by the electrohydraulic transmission control or a lubrication pressure for the dynamic pressure compensation of a rotating clutch is present. But the second pressure chamber 8, for example, can also be associated with a pressure compensation chamber (not shown) for compensating the dynamic pressure of the rotating primary pressure chamber 31 and is loaded with lubrication pressure. If the variator shaft 1 is a secondary shaft, then the above described secondary pressure chamber 8 can be particularly a pressure compensation chamber for compensating the dynamic pressure of the rotating secondary pressure chamber, but also, for example, a clutch space of a clutch disposed upon the secondary shaft.

| | Reference numerals | | |
|---|---|---|---|
| 1 | variator shaft | 63 | tubular projection of the inner cover |
| 10 | axial hole of the variator shaft | 64 | bearing race for rectangular ring of the variator shaft |
| 11 | section of the variator shaft on the side of the housing cover | 65 | tubular projection of the housing cover |
| 12 | sealing ring of the variator shaft | 66 | second pressure duct in the housing cover |
| 13 | first section of the axial hole of the variator shaft | 7 | pipe |
| 14 | radial hole of the variator pressure supply | 71 | pipe section on the side of the housing cover |
| 15 | second section of the axial hole of the variator shaft | 72 | second pipe section |
| 2 | variator pulley | 73 | sealing ring of the pipe |
| 21 | linear guide of the variator pulley | 8 | second pressure chamber |
| 3 | cylinder | 9 | vent hole |
| 31 | variator pressure chamber | 91 | cover of the vent hole |
| 4 | bearing | 92 | axial vent hole |
| 5 | transmission housing | 93 | transmission inner area on the bearing |
| 6 | housing cover | | |
| 61 | variator pressure duct in the housing cover | 94 | transmission inner area beneath a chain drive means |
| 62 | inner cover | | |

What is claimed is:

1. A variator for ratio adjustment of a continuously variable chain drive transmission, the variator comprising:
   a variator shaft (1);
   a variator pulley (2) supported on the variator shaft (1) and axially movable by pressurization supplied to at least one variator pressure chamber (31);
   the variator shaft (1) having an axial hole (10), formed in one end thereof, through which a supply of pressurized fluid to both the variator pressure chamber (31) and a second pressure chamber (8) can be provided independent of one another, a non-rotating pipe (7) being located within the axial hole (10) and have a central passage for supplying pressurized fluid to the second pressure chamber (8);
   wherein an exterior surface of the non-rotating pipe (7) and an inwardly facing surface of the axial hole (10) define therebetween a variator passageway, communicating with a radial hole (14) in the variator shaft (1), for suppling pressurized fluid to the variator pressure chamber (31); and the central passage and the variator passage are sealed with respect to one another;
   the exterior surface of the pipe (7) has two axially adjacent sealing rings (73) for dynamic sealing of the central passageway, which supplies pressurized fluid to the second pressure chamber (8), from the variator passage, which supplies pressure fluid to the variator pressure chamber (31); and a vent hole (9, 92) is formed in the variator shaft (1) and a first end of the vent hole (9, 92) communicates with an area of the non-rotating pipe located between the two axially adjacent sealing rings (73) while a second end of the vent hole (9, 92) communicates with a transmission inner space (93, 94) to facilitate venting to the transmission inner space (93, 94) of any pressurized fluid which flows into the area located between the two axially adjacent sealing rings (73).

2. The variator according to claim 1, wherein the vent hole (9) has an outlet which discharges radially into the transmission inner space (94) adjacent a drive chain of the variator.

3. The variator according to claim 1, wherein the vent hole (9) is one of a radially extending hole and a diagonally extending hole.

4. The variator according to claim 1, wherein the variator shaft (1) is a primary shaft of the variator.

5. The variator according to claim 1, wherein the variator shaft (1) is a secondary shaft of the variator.

6. The variator according to claim 1, wherein the second pressure chamber (8) is a clutch pressure space which is loadable with a modulatable shifting pressure.

7. The variator according to claim 1, wherein the second pressure chamber (8) is a pressure compensation space which is loadable with a lubrication pressure.

8. The variator according to claim 1, wherein the vent hole (9) is a radially extending hole and further comprises another hole (92) extending parallel to the vent hole (9).

9. A variator for ratio adjustment of a continuously variable chain drive transmission, the variator comprising:
   a variator shaft (1);
   a variator pulley (2) supported on the variator shaft (1) and axially movable by pressurization supplied to at least one variator pressure chamber (31);
   the variator shaft (1) having an axial hole (10), on one end thereof, through which the variator pressure chamber (31) and a second pressure chamber (8) can be supplied with pressurized fluid independent of one another, the supply of pressurized fluid to the second pressure chamber (8) occurring via a non-rotating pipe (7) and the supply of pressurized fluid to the variator pressure chamber (31) occurring between an exterior surface of the non-rotating pipe (7) and an inwardly facing surface of the axial hole (10), the pipe (7) being located within a first hole section (13) of the axial hole (10) and the supply of pressurized fluid to the variator pressure chamber (31) and to the second pressure chamber (8) are reciprocally sealed;
   wherein the pipe (7) has two axially adjacent sealing rings (73) for dynamic sealing of the supply of pressurized fluid to the second pressure space (8) from the supply of pressure fluid to the variator pressure chamber (31) and the variator shaft (1) has a vent hole (9, 92) which discharges, on one side, between the two sealing rings (73) and, on the other side, to a transmission inner space (93, 94); and
   the variator shaft (1) is supported by a transmission housing (5), and the vent hole (9, 92) discharges in the transmission inner space (93) in an area of the transmission housing supporting the variator shaft (1).

10. The variator according to claim 9, wherein the vent hole (9) has an outlet which discharges radially in the transmission inner space (94) adjacent a drive chain of the variator.

11. The variator according to claim 10, wherein the vent hole (9) is one of a radially extending hole and a diagonally extending hole.

12. The variator according to claim 9, wherein the vent hole (9, 92) discharges in the transmission inner space (93) on a front side of the end of the variator shaft (1) which has the axial hole (10).

13. The variator according to claim 9, wherein the vent hole (9) has an outlet which discharges radially into the transmission inner space (94) adjacent a drive chain of the variator.

14. The variator according to claim 9, wherein the vent hole (9) is one of a radially extending hole and a diagonally extending hole.

15. The variator according to claim 9, wherein the variator shaft (1) is a primary shaft of the variator.

16. The variator according to claim 9, wherein the variator shaft (1) is a secondary shaft of the variator.

17. The variator according to claim 9, wherein the second pressure chamber (8) is a clutch pressure space which is loadable with a modulatable shifting pressure.

18. The variator according to claim 9, wherein the second pressure chamber (8) is a pressure compensation space which is loadable with a lubrication pressure.

19. The variator according to claim 9, wherein the vent hole (9) is a radially extending hole and further comprises another hole (92) extending parallel to the vent hole (9).

20. A variator for ratio adjustment of a continuously variable chain drive transmission, the variator comprising:

a variator shaft (1);

a variator pulley (2) supported on the variator shaft (1) and axially movable by pressurization supplied to at least one variator pressure chamber (31);

the variator shaft (1) having an axial hole (10), formed in one end thereof, through which a supply of pressurized fluid to both the variator pressure chamber (31) and a second pressure chamber (8) can be provided independent of one another, a non-rotating pipe (7) being located within the axial hole (10) and having a central passage for supplying pressurized fluid to the second pressure chamber (8);

wherein an exterior surface of the non-rotating pipe (7) and an inwardly facing surface of the axial hole (10) solely define a variator passageway therebetween, communicating with a radial hole (14) in the variator shaft (1), for suppling pressurized fluid to the variator pressure chamber (31); and the central passage and the variator passage are sealed with respect to one another;

wherein the exterior surface of the pipe (7) has two axially adjacent sealing rings (73) which engage with both the exterior surface of the non-rotating pipe (7) and the inwardly facing surface of the axial hole (10) for dynamic sealing of the central passageway, which supplies pressurized fluid to the second pressure chamber (8), from the variator passage, which supplies pressure fluid to the variator pressure chamber (31); and a vent hole (9, 92) is formed in the variator shaft (1) and a first end of the vent hole (9, 92) communicates with an area of the non-rotating pipe located between the two axially adjacent sealing rings (73) while a second end of the vent hole (9, 92) communicates with a transmission inner space (93, 94) to facilitate venting to the transmission inner space (93, 94) of any pressurized fluid which flows into the area located between the two axially adjacent sealing rings (73).

* * * * *